June 16, 1931.   H. C. JOHANSEN   1,810,106
DRILLING APPARATUS
Filed Dec. 31, 1927    2 Sheets-Sheet 1
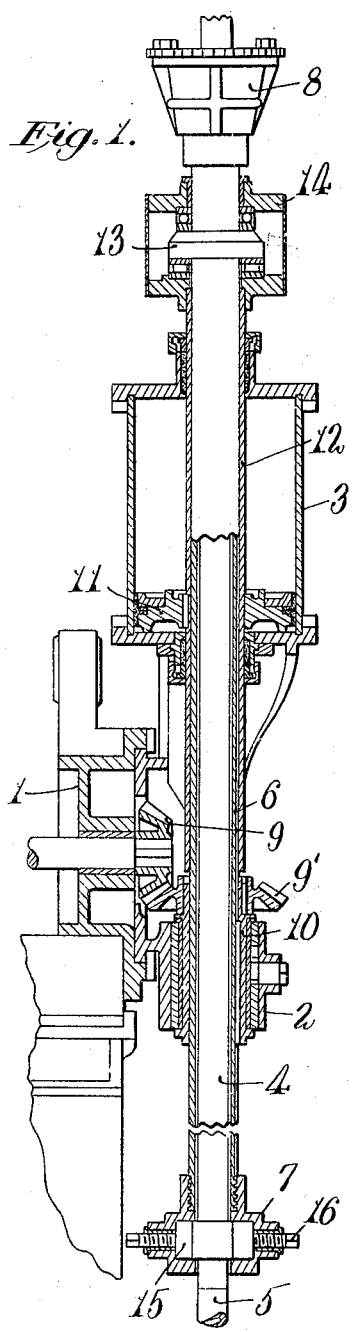
Inventor:
Harry C. Johansen.
by *Louis A. Maxon*
Attorney.

June 16, 1931.  H. C. JOHANSEN  1,810,106
DRILLING APPARATUS
Filed Dec. 31, 1927   2 Sheets-Sheet 2

Inventor:
Harry C. Johansen.
by Amis A. Maxson.
Attorney.

Patented June 16, 1931

1,810,106

UNITED STATES PATENT OFFICE

HARRY C. JOHANSEN, OF MICHIGAN CITY, INDIANA, ASSIGNOR TO SULLIVAN MACHINERY COMPANY, A CORPORATION OF MASSACHUSSETTS

DRILLING APPARATUS

Application filed December 31, 1927. Serial No. 243,907.

My invention relates to drilling apparatus.

It has for an object to provide an improvement in a drilling apparatus and more particularly in a drilling apparatus of the type adapted for oil or gas well work. A further object of my invention is to provide such apparatus with improved means for controlling the rod line, which is very simple in its construction and operation. A more specific object is to provide an improved automatic chuck mechanism for transmitting the load of the rod line to the hydraulic feeding apparatus and rotation mechanism. These and other objects and advantages of my invention will hereinafter more fully appear.

In the accompanying drawings I have shown for purposes of illustration two forms which my invention may assume in practice.

In these drawings,—

Fig. 1 is a central vertical section through a portion of a drilling apparatus having my improvement embodied therein.

Fig. 2 is a central vertical section through the improved top chuck mechanism.

Fig. 5 is a fragmentary sectional view taken on line 5—5 of Fig. 4.

Figure 3:
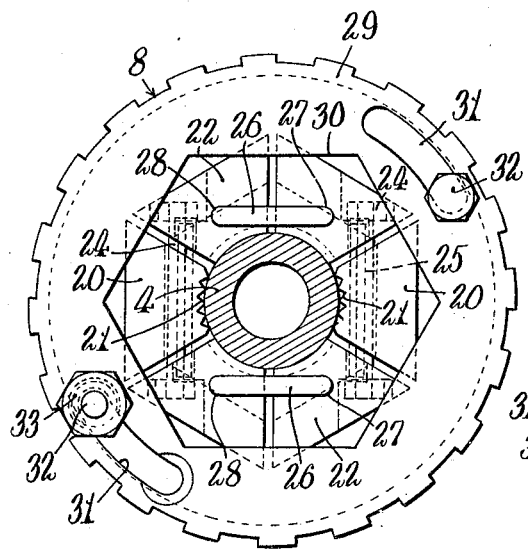
Fig. 3 is a top plan view of the same chuck mechanism, the grief stem being shown in section.

In this illustrative construction I have shown my improvement as applied to a well known type of core drill, having a frame generally designated 1 which carries a bearing 2 and a hydraulic feed cylinder 3. The grief stem 4 extends upwardly through the bearing 2 and hydraulic cylinder and carries at its lower end the rod line 5. The grief stem can be releasably connected to a sleeve 6 by means of a lower chuck mechanism 7 and a top chuck 8. The grief stem and rod line are rotated during the drilling operation by any usual driving mechanism employing a pair of bevel gears 9 and 9', the latter being keyed to a sleeve 10 journaled in the bearing 2 and splined to sleeve 6. The weight of the rod line is carried by a hydraulic feed piston 11 mounted in the cylinder 3 through an outer sleeve 12 which serves as a piston rod. The inner sleeve 6 has a collar 13 fixed thereto to form a swivel mounting for the grief stem in a swivel head 14 carried by the sleeve or piston rod 12. Thus the sleeve 6 which carries the grief stem is connected to the hydraulic piston in such a manner as to permit relative rotating movement and prevent relative longitudinal movement. The lower chuck 7 is of the usual positive type having a plurality of jaws 15 controlled by set screws 16 and serves to take part of the weight of the rod line and transmit any possible downward force of the hydraulic piston upon the rod line. When a long length of rod line is being used the chuck 7 is inadequate to carry the load and for this purpose there is provided a top chuck 8. My invention is directed particularly to an improvement in this latter chuck, which will permit the same to operate under normal drilling operations without any attention from the operator and possesses certain other novel features of construction and arrangement of parts which will now be described.

Figure 4:
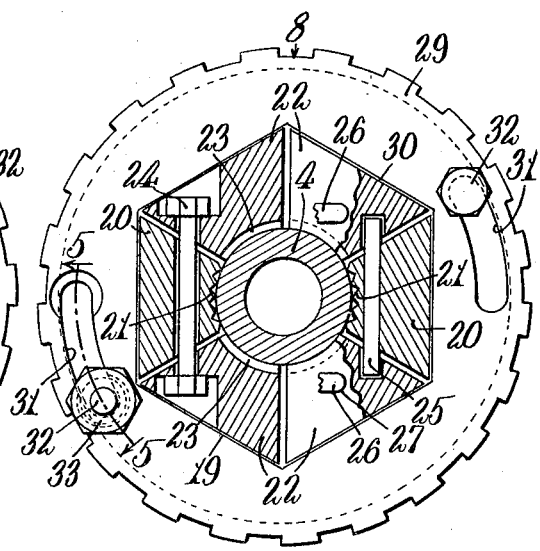
Fig. 4 is a view of the same chuck mechanism, showing the locking plate in a different position and the chuck jaws in section.
Figure 6:
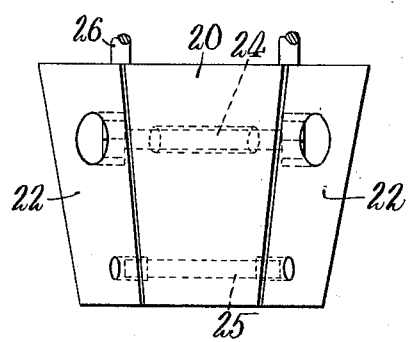
Fig. 6 is a detail view, illustrating the manner in which the chuck jaws are secured together.

The improved top chuck comprises a casing 17 connected by a screw joint 18 with the sleeve 6, and having a plurality of interior wedge surfaces 19. In this chuck casing are mounted a plurality of jaws 20 having vertically arranged teeth 21 and also a second set of jaws 22 having horizontally arranged teeth 23. The jaws are loosely secured together in sets of three by means of bolts 24 and pins 25 so that a number of the jaws may be removed as a single unit. For the purpose of removing the jaws by hand, they may be provided with any suitable handle such as a cable 26 secured at 27 and 28 to each set of jaws. The jaws are held against removal from the casing during normal operation by means of a locking plate 29, having in this instance a hexagonal opening 30, which, when the plate is turned to the proper position as indicated in Fig. 4, will permit removal of the chuck jaws. For the purpose of permitting the desired rotatable movement of plate 29 it has a pair of slots 31 formed therein through which extend guiding and retaining bolts 32, one of which is provided with a suitable lock nut 33 for clamping the plate in position. When the plate is turned to the position illustrated in Fig. 3, it will be apparent that the jaws are each held against removal from the casing by engagement of portions of the plate with the corners of the jaws. In Fig. 2 it will be noted that there is a limited amount of clearance provided between the ends of the chuck jaws and the locking plate 29, so as to permit the necessary longitudinal movement between the jaws and casing for releasing the grief stem.

It is believed that the mode of operation of this apparatus will be clear in view of the above description. As it is well understood in the art, the chucks 7 and 8 will be locked to the grief stem when the hydraulic piston 11 is in the upper portion of the cylinder and the drill rod will be rotated and simultaneously fed downwardly until the hydraulic piston reaches the lower end of the cylinder. At this time the set screw 16 will be loosened thereby releasing the chuck 7 and the hydraulic piston will be elevated to get another grip on the grief stem. It will be evident that no attention need be given to the top chuck, since the sleeve 6 and chuck 7 is free to move upwardly, the chuck jaws being automatically released because of the wedge action between the jaws and casing. It will be evident that during drilling the jaws 20, having vertically arranged teeth, will serve to transmit rotation between sleeve 6 and the grief stem while the other chuck jaws 22 will carry the weight of the rod line.

Figure 7:
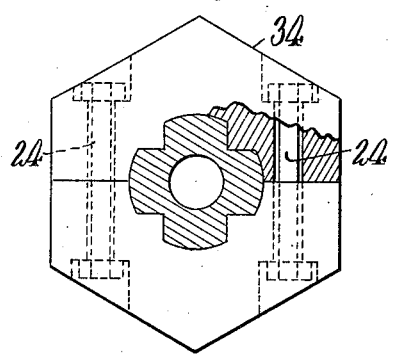
Fig. 7 illustrates a modification of the chuck adapted for use with a different type of grief stem.
Figure 8:
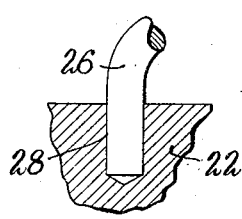
Fig. 8 is a detail view illustrating one suitable means for handling the chuck jaws.

In the modification illustrated in Fig. 7, the chuck consists merely of a pair of jaws, having wedge surfaces 34 to cooperate with the interior wedge surfaces on casing 17 and having interior gripping surfaces adapted to closely fit the grief stem which is of cruciform cross section and hold the same by friction. The operation of this modification is very similar to the operation of the other form, except that friction alone is depended upon to hold the grief stem against longitudinal movement, while the shape of the grief stem itself and cooperating jaws is such as to prevent any relative rotation. The sets of jaws are interchangeable.

As a result of my invention it will be evident that there has been provided an improved chuck mechanism, which functions without any attention from the operator and automatically prevents relative longitudinal movement between the grief stem and sleeve 6 in one direction and also aids in transmitting the resistance to rotation to the rod line to the rotation mechanism. At the same time the check is so constructed that the jaws may be readily removed by simply turning the locking plate and lifting them out of the casing.

While I have in this application specifically described two forms which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a drilling apparatus, a chuck for locking a pair of telescopically arranged elements against relative rotative movement and against telescoping movement in one direction, said chuck comprising a casing having interior inclined surfaces, a plurality of gripping members loosely mounted in said casing and having inclined surfaces cooperating with said inclined surfaces in the casing, and means rotatable relatve to said casing for locking said gripping members against removal while permitting limited movement thereof in said casing, said rotatable means including a rotatable locking member having a central irregular-shaped opening through which one of said telescopic elements extends and when in locking position having portions overlying said gripping members to maintain the same within said casing and when in released position said opening being of such shape as to permit removal of said gripping members from said casing through said opening.

2. In a drilling apparatus, a chuck for locking a pair of telescopically arranged elements against relative rotative movement and against telescoping movement in one direction, said chuck comprising a casing having interior inclined surfaces, chuck jaws mounted in said casing, some of said jaws being loosely connected together to permit removal thereof as a single unit, and means for locking said chuck jaws within said casing comprising a rotatable member having a central irregular-shaped opening through which one of said telescopic elements extends, said rotatable member when in locking position having portions overlying said gripping members to maintain the same within said casing and when in released position said opening being of such shape as to permit removal of said chuck jaws from said casing through said opening.

3. In a drilling apparatus, a chuck for locking a pair of telescopically arranged elements against relative rotative movement and against telescoping movement in one direction, said chuck comprising a casing having a plurality of inclined surfaces on the interior thereof, a plurality of gripping members arranged within the casing to engage one of said telescoping elements, certain of said members having vertical teeth thereon adapted to resist rotation and others of said gripping members having transversely arranged teeth for preventing relative longitudinal movement between the telescopic elements and casing in one direction, and means for locking said gripping members within said casing comprising a rotatable locking member having a central opening through which the telescopic element gripped by said members extends, said rotatable member being secured to said casing for limited rotation and when in locking position having portions overlying said gripping members to maintain the same within said casing and when in released position permitting removal of said gripping members from said casing through said opening without detaching said locking member from said casing.

4. In a drilling apparatus, a chuck for locking a pair of telescopically arranged elements against relative rotative movement and against telescoping movement in one direction, said chuck comprising a casing having a plurality of interior inclined surfaces, a plurality of gripping members having cooperating inclined surfaces and loosely mounted in said casing, and a locking plate carried by said casing and having a non-circular opening therein permitting removal of said gripping members therethrough, said plate being rotatable to either of two positions and said opening being of such shape as to permit removal of said gripping members or to lock the same in said casing without detaching said locking plate from said casing.

5. In a drilling apparatus, a chuck for locking a pair of telescopically arranged elements against relative rotative movement and against telescoping movement in one direction, said chuck comprising a casing having a polygonal opening therein having flat inclined walls, wedge-shaped gripping jaws mounted in said casing and having inclined surfaces engaging said walls, and means for locking said jaws within said casing comprising a locking member having a similarly shaped polygonal opening adapted to be brought into registry with the polygonal opening in said casing to permit removal of said jaws from said casing through said opening, said locking member being adjustable to bring said openings out of registry to lock said jaws within said casing.

6. In a drilling apparatus, a chuck for locking a pair of telescopically arranged elements against relative rotative movement and against telescoping movement in one direction, said chuck comprising a casing having a polygonal opening therein having flat inclined walls, wedge-shaped gripping jaws mounted in said casing and having inclined surfaces engaging said walls, and means for locking said jaws within said casing comprising a locking member having a similarly shaped polygonal opening adapted to be brought into registry with the polygonal opening in said casing to permit removal of said jaws from said casing through said opening, said locking member being adjustable to bring said openings out of registry to lock said jaws within said casing, and means for maintaining said locking member in its locking position.

7. In a drilling apparatus, a chuck for locking a pair of telescopically arranged elements against relative rotative movement and against telescoping movement in one direction, said chuck comprising a casing having a polygonal opening therein having flat inclined walls, wedge-shaped gripping jaws mounted in said casing and having inclined surfaces engaging said walls, and means for locking said jaws within said casing comprising a locking member having a similarly shaped polygonal opening adapted to be brought into registry with the opening in said casing to permit removal of said jaws from said casing through said opening, said locking member being adjustable to bring said openings out of registry to lock said jaws within said casing, means for limiting rotation of said locking member relative to said casing, and means for maintaining said locking member in its locking position.

8. In a drilling apparatus, a chuck for locking a pair of telescopically arranged members against telescoping movement in one direction comprising a casing having a chamber presenting downwardly and inwardly converging surfaces and having a top opening, wedge-shaped gripping members having inclined surfaces engaging the inclined surfaces in said casing and insertible into and withdrawable from said casing through said top opening, and means for locking said gripping members in said casing comprising a locking plate having a similarly shaped opening adapted to be brought into registry with the top opening in said casing to permit removal of said gripping members from said casing through said openings, said locking plate being rotatable relative to said casing to bring said openings out of registry to lock said gripping members within said casing.

9. A drill rod chuck comprising a casing having a chamber for receiving a plurality of wedge shaped gripping members adapted to grip a drill rod, gripping members in said chamber, and means for locking said members in said casing including a rotatable locking plate having an opening through which the gripping members are insertible into and removable from said casing, said plate being rotatable into one position to prevent removal of said gripping members through said opening and into another position to permit removal of said gripping members through said opening.

10. In a drilling apparatus, a chuck for locking a pair of telescopically arranged elements against telescoping movement in one direction comprising a casing having an opening therein, chuck jaws mounted in said casing and insertible into and withdrawable therefrom through said opening, and means for locking said jaws within said casing comprising a locking member having a similarly shaped opening adapted to be brought into registry with the opening in said casing to permit removal of said jaws from said casing through said openings, said locking member being rotatable to bring said openings out of registry to lock said jaws in said casing.

11. In a drilling apparatus, a chuck for locking a pair of telescopically arranged elements against telescoping movement in one direction comprising a casing having an opening therein, chuck jaws mounted in said casing and insertible into and withdrawable therefrom through said opening, means for locking said jaws within said casing comprising a locking member having a similarly shaped opening adapted to be brought into registry with the opening in said casing to permit removal of said jaws from said casing through said openings, said locking member being rotatable to bring said openings out of registry to lock said jaws in said casing, and means for maintaining said locking member in its locking position.

12. In a drilling apparatus, a chuck for locking a pair of telescopically arranged elements against telescoping movement in one direction comprising a casing having an opening therein, chuck jaws mounted in said casing and insertible into and withdrawable therefrom through said opening, means for locking said jaws within said casing comprising a locking member having a similarly shaped opening adapted to be brought into registry with the opening in said casing to permit removal of said jaws from said casing through said openings, said locking member being rotatoble to bring said openings out of registry to lock said jaws in said casing, means for limiting rotation of said locking member relative to said casing to insure exact registry of said openings when said locking member is in its released position, and means for maintaining said locking member in its locking position.

13. A drill rod chuck comprising a casing having a chamber therein having inclined walls and a top opening, wedge-shaped slips mounted in said casing and having inclined surfaces engaging said inclined walls, said slips being insertible into and withdrawable from said casing through said top opening, and means for locking said slips within said casing comprising a locking member having a similarly shaped opening adapted to be brought into registry with the opening in said casing to permit removal of said slips from said casing through said openings, said locking member being adjustable to bring said openings out of registry to lock said slips within said casing.

In testimony whereof I affix my signature.

HARRY C. JOHANSEN.